United States Patent [19]

Sorin

[11] Patent Number: 5,365,335
[45] Date of Patent: Nov. 15, 1994

[54] OPTICAL LOW-COHERENCE REFLECTOMETER USING OPTICAL ATTENUATION

[75] Inventor: Wayne V. Sorin, Mountain View, Calif.

[73] Assignee: Hewlett-Packard Company, Palo Alto, Calif.

[21] Appl. No.: 210,656

[22] Filed: Mar. 18, 1994

Related U.S. Application Data

[63] Continuation of Ser. No. 889,542, May 27, 1992, abandoned.

[51] Int. Cl.$^5$ ............................................. G01B 9/02
[52] U.S. Cl. ................................... 356/345; 356/73.1; 250/227.19; 385/12
[58] Field of Search ................... 356/73.1, 345, 349; 250/227.19, 227.27; 385/12

[56] References Cited

U.S. PATENT DOCUMENTS

| | | | |
|---|---|---|---|
| 4,875,772 | 10/1989 | Gentile | 356/73.1 |
| 4,997,277 | 3/1991 | Horiguchi et al. | 356/73.1 |
| 5,268,738 | 12/1993 | Baney et al. | 356/345 |
| 5,268,741 | 12/1993 | Chou et al. | 356/351 |
| 5,291,267 | 3/1994 | Sorin et al. | 356/345 |

FOREIGN PATENT DOCUMENTS

| | | | |
|---|---|---|---|
| 0153924 | 6/1989 | Japan | 356/349 |
| 1222177 | 2/1971 | United Kingdom | G01N 21/26 |

OTHER PUBLICATIONS

Takada, et al., "Rayleigh Backscattering Measurements of Single-Mode Fibers by Low-Coherence Optical Time-Domain Reflectometry with 14mm Spatial Resolution", Appl. Phys. Lett., 59, p. 143, 1991.

Takada, et al., "Phase-Noise and Shot-Noise Limited Operations of Low Coherence Optical Time Domain Reflectometry", Appl. Phys. Lett. 59 11 Nov. 1991, pp. 2483-2485.

Masaru Kobayashi et al., "Optical Fiber Component Characterization by High-Intensity and High-Spatial-Resolution Interferometric Optical-Time-Domain Reflectometer", IEEE Photonics Tech. Letters, vol. 3, No. 6, Jun. 1991, pp. 564-566.

Takada, et al., "Ultrahigh-Sensitivity Low Coherence OTDR Using $Er^{3+}$-Doped High-Power Superflourescent Fibre Source", Electronics Letters, Jan. 1992, vol. 28, No. 1, pp. 29-31.

*Primary Examiner*—James C. Housel
*Assistant Examiner*—Harold Y. Pyon

[57] ABSTRACT

A low-coherence reflectometer for use in measuring optical backscattering. The invention utilizes an optical attenuation in the reference arm of a Michelson interferometer to reduce the relative intensity noise. The invention obtains essentially the same performance as obtained with balanced detector schemes while maintaining the simplicity of the Michelson interferometer design and increased scan distance.

3 Claims, 5 Drawing Sheets

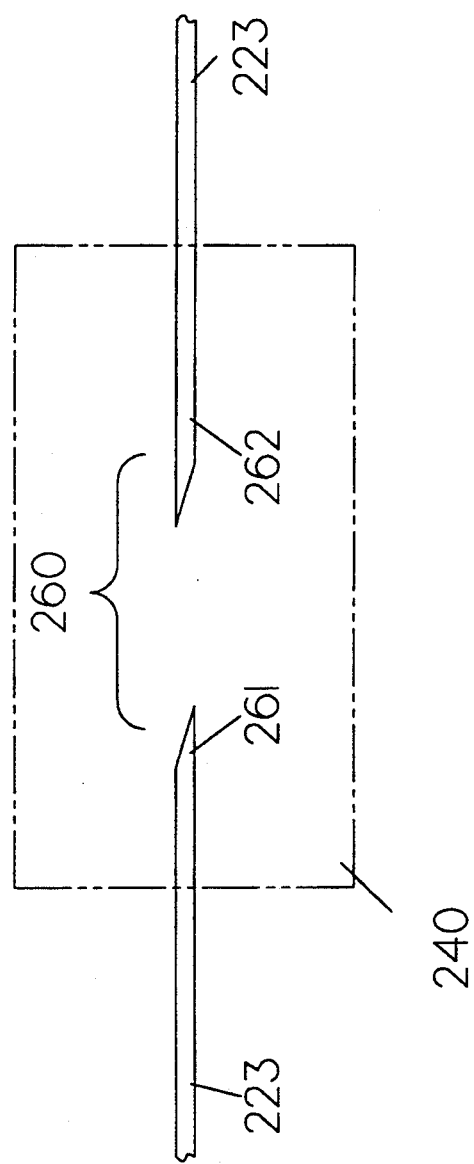

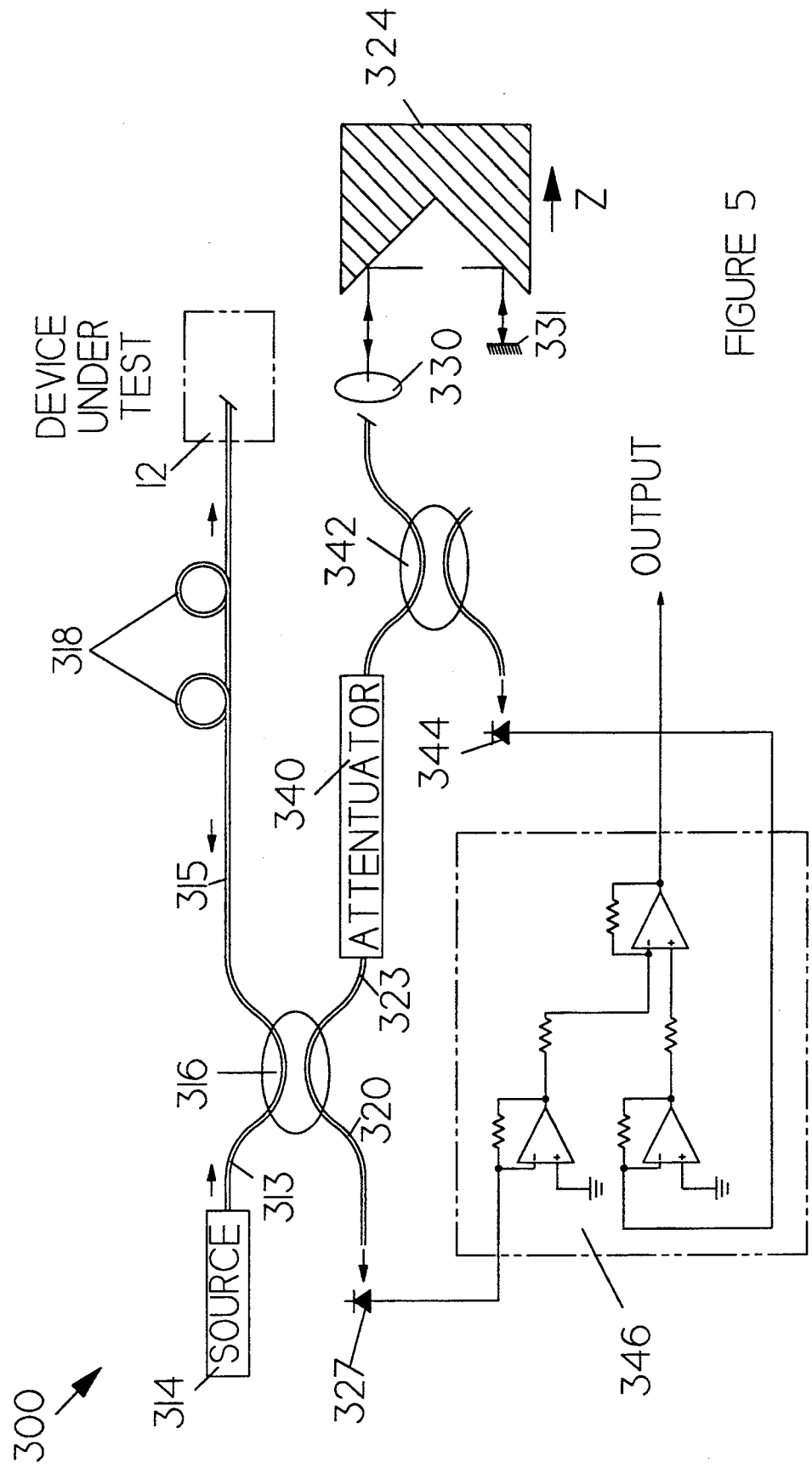

OPTICAL LOW-COHERENCE REFLECTOMETER USING OPTICAL ATTENUATION

This is a continuation of copending application Ser. No. 07/889,542 filed on May 27, 1992, now abandoned.

FIELD OF THE INVENTION

The present invention relates to optical measurements, and more particularly, to optical reflectometry.

BACKGROUND OF THE INVENTION

The increased use of optical components in communication and data processing systems has created an increased need for a method for measuring optical inhomegenities in optical components. For example, in fiber optic based communication systems there is a need to measure splice losses and the location of non-reflecting fiber breaks. Similarly, there is a need for a methodology for characterizing optical components such as silica based optical planar wave guides and $LiNbO_3$ wave guides.

One method for analyzing inhomegenities in optical fibers is optical time domain reflectometry. In this method, a light pulse is transmitted down the optical fiber and the Rayleigh backscattered light resulting from the interaction of the light pulse with an inhomogeneity in the fiber is measured. The time delay between the incident light pulse and reflected light provides information on the location of the inhomogeneity. The amplitude of the backscattered light signal provides information on the degree of inhomogeneity. In conventional pulsed techniques, the measurement of the backscattered light becomes more difficult as spatial resolution is improved. Higher spatial resolution simultaneously results in lower levels of backscattered light power and increased noise power due to larger receiver bandwidths.

White light interferometry or optical low-coherence reflectometry provides a technique that allows several orders of magnitude improvement in both sensitivity and spatial resolution compared to conventional time domain methods. Spatial resolutions of 20 to 40 microns have been reported using this technique. This resolution is equivalent to the resolution that would be obtained using pulse widths of a few hundred femtoseconds with conventional pulse techniques. For these resolutions, the average backscattered levels for standard telecommunications fibers are of the order of −115 dB. Reflection sensitivities have been limited to values close to the backscattered levels due to the noise intensity of low-coherence optical sources. However, a reflection sensitivity of −136 dB has been demonstrated at a wavelength of 1.3 microns using a high-power superluminescent diode and a balanced detection scheme to minimize the effects of noise [Takada, et al., "Rayleigh Backscattering Measurements of Single-Mode Fibers by Low Coherence Optical Time-Domain Reflectometry With 14 mm Spatial Resolution", Appl. Phys. Lett., 59, p. 143, 1991].

While the low-coherence reflectometry technique taught by Takada, et al. provides the resolution and sensitivity to perform the measurements in question. the apparatus is significantly more complex than a conventional Michelson interferometer. The apparatus achieves its increased signal to noise ratio by using a balanced detector to subtract one component of the noise. To construct this balanced detector, additional optical and electrical components must be added to the system which increase the system cost and complexity. In addition, the range of distances over which measurements can be made is reduced by a factor of two relative to a Michelson interferometer. Hence, the technique taught by Takada, et al. has a smaller scan distance than a conventional Michelson interferometer.

Broadly, it is an object of the present invention to provide an improved low-coherence reflectometry measurement apparatus and method.

It is a further object of the present invention to provide a low-coherence reflectometry system with signal-to-noise performance comparable to that achieved by Takada, et al., in an apparatus having the complexity of a Michelson interferometer.

It is yet another object of the present invention to provide a low-coherence reflectometry system with improved signal-to-noise that preserves the scan distance of a conventional Michelson interferometer.

These and other objects of the present invention will become apparent to those skilled in the art from the following detailed description of the invention and the accompanying drawings.

SUMMARY OF THE INVENTION

The present invention comprises an optical interferometer for measuring the optical properties of a device. A source of low-coherence light is used to illuminate the device with the aid of a beam splitter which divides the light into first and second light signals. The first light signal is applied to the device. The second light signal is input to a variable optical path length reference path. The light signals returning from the reference path and from the device are combined by the beam splitter and then applied to an optical detector. The reference optical path includes an optical attenuator for reducing the intensity of light leaving the reference optical path. In one embodiment of the present invention, a portion of the attenuated light is used to measure the relative intensity noise, and the measured noise is subtracted from the signal generated by the optical detector or used in a feedback circuit to reduce the source intensity noise.

BRIEF DESCRIPTION OF THE DRAWINGS

FIG. 4 illustrates the preferred embodiment of an attenuator according to the present invention.

FIG. 5 is a block diagram of a second embodiment of an interferometer according to the present invention.

DETAILED DESCRIPTION OF THE INVENTION

Figure 1:
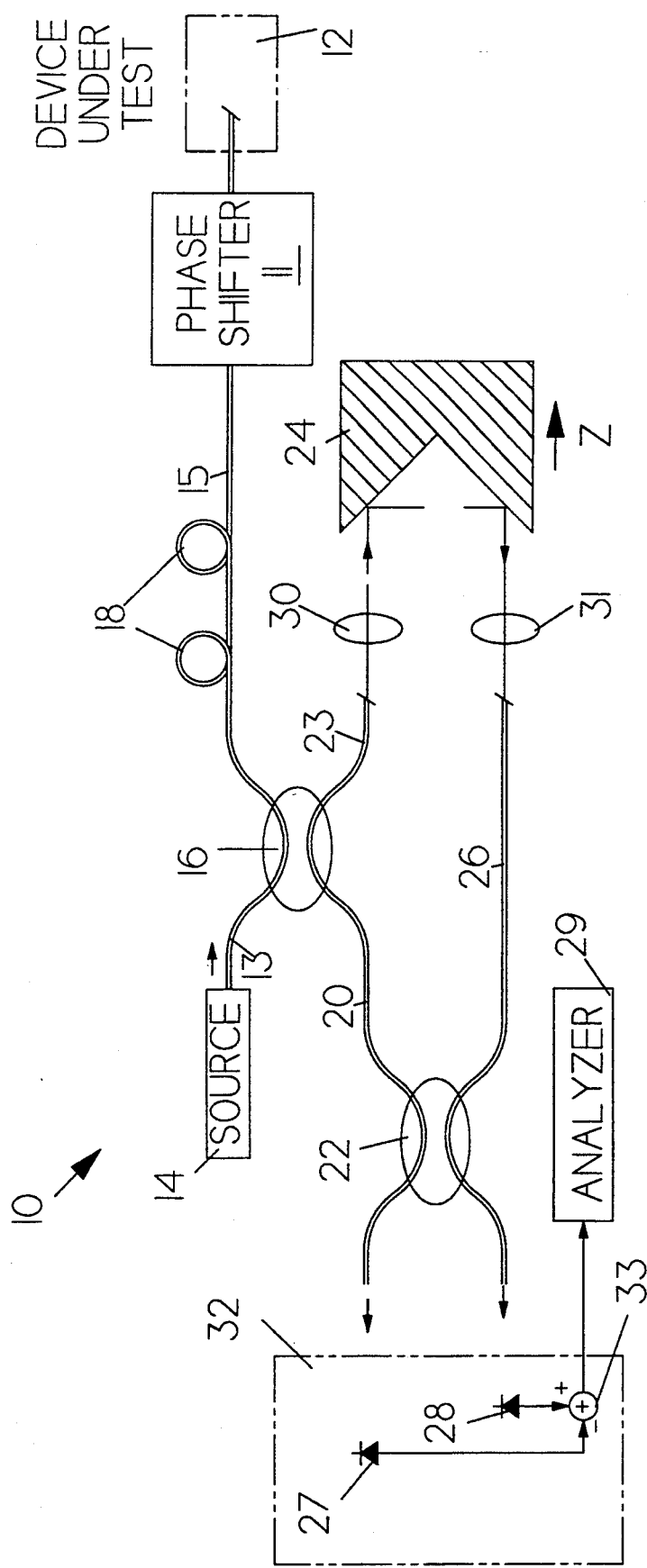
FIG. 1 is a block diagram of a low-coherence reflectometer.

The manner in which a low-coherence reflectometer utilizing a balanced detector operates may be more easily understood with reference to FIG. 1 which is a schematic diagram of a low-coherence reflectometer 10 for measuring the optical properties of a device 12. A low-coherence light source 14 is used to illuminate device 12. Optical coherence length of the light from light source 14 determines the spatial resolution of the measurements. A suitable light source may be constructed by utilizing the amplified spontaneous emission from an erbium-doped fiber. Such fibers are known to the optical arts and hence will not be discussed in more detail here. Light from source 14 is split by coupler 16 which is connected to source 14 by fiber 13. Coupler 16 divides the light between two arms of the interferometer. The first arm comprising fiber 15 delivers light to device 12. The polarization of the light is controlled by two polarization control loops 18. An optional phase shifter may be included in this arm of the interferometer. Backscattered light from device 12 is returned to coupler 16 via fiber 15. A portion of the backscattered light is delivered to a second coupler 22 via fiber 20.

The second arm of the interferometer has a variable time delay. The portion of the light from coupler 16 that is not routed down fiber 15 is routed to fiber 23 and provides a reference light signal. This light is imaged by lens 30 on a mirror 24 which is mounted on a moving stage. The motion in the Z direction alters the optical path length of the second arm of the interferometer. Light leaving mirror 24 is imaged into fiber 26 by lens 31 and delivered to coupler 22. Coupler 22 acts as an adder for combining the backscattered light from device 12 and the reference signal light from source 14. When the time delay from in the second arm of the interferometer matches the time delay of a reflection from device 12, coherent interference occurs producing a beat signal at a predetermined frequency. The power in the light signal at the beat frequency is detected by a balanced detector 32 comprising two photodiodes 27 and 28 and an adder 33. The subtracted output is then processed electronically to detect the strength of the interference signal. For example, the power spectrum of the subtracted output may be measured by a spectrum analyzer 29.

The beat frequency is preferably chosen to coincide with a minimum in the receiver noise floor. The frequency may be controlled by either of two methods. The preferred method uses phase shifter 11 which is sawtooth ramped over a range of 180 degrees producing a serrodyne frequency shift on the returning signal. In this case, the beat signal will be at the serrodyne frequency with a strength dependent on the magnitude of the reflection. In this type of system, mirror 24 is stepped through each position and the signal averaged for a sufficient time to provide the desired signal to noise. Alternatively, phase shifter 11 can be eliminated and mirror 24 moved in a continuous manner during the measurement. The continuous motion results in a Doppler shift in the frequency of the light in the second arm of the interferometer. The beat frequency will be at the Doppler shift frequency. Unfortunately, jitter in the mechanical stage limits the extent to which a narrow band Doppler frequency shift can be generated; hence, the first technique is preferred to maximize the reflection sensitivity.

Couplers 16 and 22 are conventional fused couplers constructed by fusing two optical fibers together. Such couplers are conventional in the art, and hence, will not be discussed in more detail here.

Figure 2:
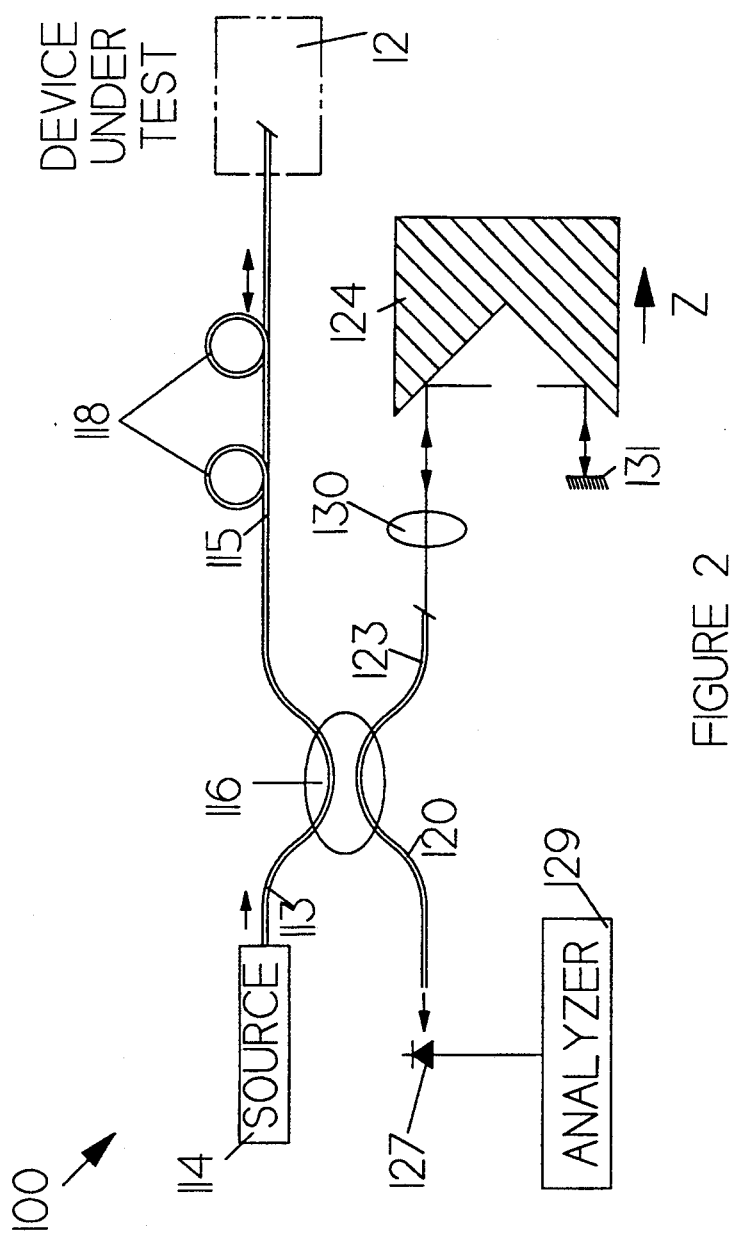
FIG. 2 is a block diagram of a conventional Michelson interferometer.

While interferometer 10 provides a signal-to-noise ratio which is limited by the shot noise, it is significantly more complex than a Michelson interferometer. A typical Michelson interferometer is shown at 100 in FIG. 2. Light from source 114 is directed to a beam splitting coupler 116 via fiber 113. Coupler 116 splits the light into two parts. The first part is delivered to device 12 via fiber 115. A portion of the backscattered light returns to coupler 116 via fiber 115. The remainder of the light incident from source 114 on coupler 116 is directed into fiber 123 and provides the reference signal for the interference. The path length in the reference arm is determined by the position of movable mirror 124. Light traversing mirror 124 from fiber 123 is reflected by stationary mirror 131 back into fiber 123 with the aid of lens 130. The returning light is combined with the backscattered light from device 12 by coupler 116. The combined light is directed to detector 127 via fiber 120. The output of detector 127 is then fed to analyzer 129. Interferometer 100 assumes that the beat frequency is set by the doppler shift provided by the motion of mirror 124. However, it will be apparent to those skilled in the art that a phase shifter analogous to phase shifter 11 shown in FIG. 1 may also be utilized to generate the beat frequency.

It will be apparent from a comparison of interferometers 10 and 100 that interferometer 100 is considerably simpler in design and requires significantly fewer components. In addition, interferometer 100 can detect scattering centers in device 12 over twice the range of distances for a given motion of mirror 124. Interference of the backscattered light and reference signal occurs when the optical path length between coupler 116 and the interference center in device 12 is equal to the optical path length from coupler 116 to mirror 131. Consider two scattering centers separated by a distance D in device 12. To detect both centers, the difference mirror positions on the reference arm between the minimum and maximum Z values must be at least D in the case of interferometer 10. Since mirror 131 effectively doubles the reference arm path length in interferometer 100, the difference in mirror positions need only be D/2. Hence, interferometer 100 has twice the distance range of interferometer 10 for a given mirror translation.

The present invention is based on the observation that in many cases, the reflection sensitivity is limited by the relative intensity noise (RIN) on the source. Increasing the source power does not improve sensitivity, since the noise due to RIN increases at the same rate as the signal strength. The noise problems with a conventional Michelson interferometer arise from the fact that the power in the reference signal returned via fiber 123 is too large in comparison to the signal from device 12 in many cases of interest. Denote the power of the source by $P_0$ and the reflectance of device 12 by R. One half the output power is delivered to device 12 via coupler 116. Coupler 116 delivers one half the signal power reflected by device 12 to detector 127. Hence, the signal from device 12 has a power given by $$P_{DUT} = \tfrac{1}{4} P_0 R \tag{1}$$

The power, $P_{REF}$, delivered to detector 127 from the reference arm is given by $$P_{REF} = \tfrac{1}{4} P_0 \tag{2}$$

The case of most interest is that in which R is very small. This is the case in which noise is the most important. In this case, $P_{DUT} << P_{REF}$, and hence, the power delivered to the detector, $P_D$ is approximately equal to $P_{REF}$. In this case, it can be shown that the signal-to-noise ratio, SNR, is given by $$SNR \alpha \frac{P_{DUT}P_{REF}}{P_{REF} + K_0 P_{REF}^2} \quad (3)$$

where, $K_0$ is a constant. The shot noise current is proportional to $P_{REF}$ while the relative intensity noise current is proportional to $K_0 P^2_{REF}$. The interferometer shown in FIG. 1 removes the contribution due to RIN via a subtraction technique which is equivalent to setting the RIN noise term equal to zero in Eq. (3). In this case, the signal-to-noise ratio is reduced to $P_{DUT}$ which is the best performance obtainable.

Figure 3:
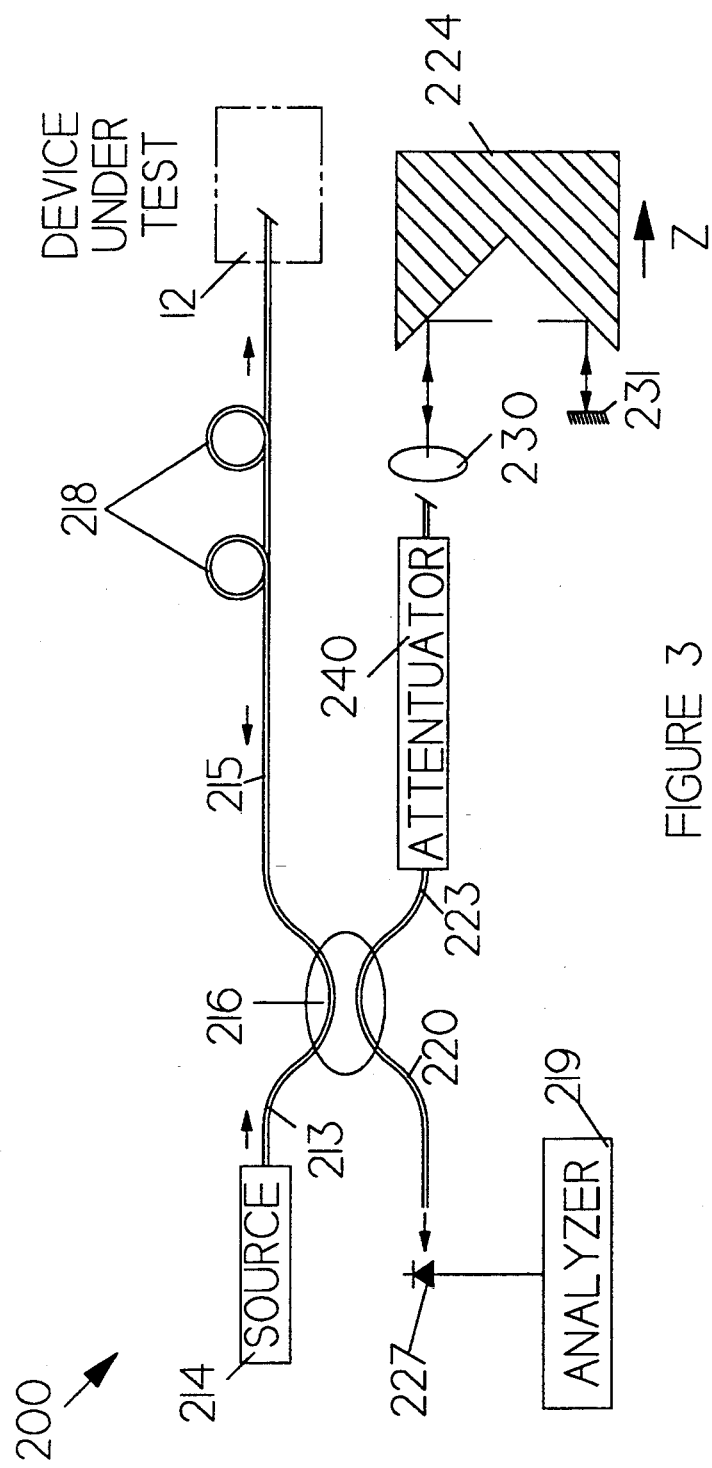
FIG. 3 is a block diagram of one embodiment of an interferometer according to the present invention.

The present invention obtains the same performance by attenuating the reference power. In an interferometer according to the present invention, the reference power is decreased by including an attenuator in the reference and of the interferometer. An interferometer according to the present invention is shown in FIG. 3 at 200. Those components of interferometer 200 that serve analogous functions to components of interferometer 100 are labeled with like numbers. As will become apparent from a comparison of interferometers 100 and 200, the essential difference between the two is the presence of an attenuator 240 in optical fiber 223. The attenuation is set such that $$P_{REF} >> K_0 P^2_{REF} \quad (4)$$

If this condition is satisfied, then the signal-to-noise ratio will be essentially the same as that obtained using the balanced detector scheme shown in FIG. 1. However, significant improvements in device complexity and scan distance are obtained. It should be pointed out that $P_{ref}$ cannot be made too small. The above discussion assumes that noise in the receiver is small compared to the shot noise. If $P_{ref}$ is made too small, noise in the receiver will become the dominant noise source.

Care must be exercised in constructing attenuator 240 to assure that the attenuator does not itself introduce reflections. The preferred embodiment of attenuator 240 is shown in FIG. 4. Attenuator 240 is preferably implemented by introducing an air gap 260 in fiber 223 shown in FIG. 3. The ends 261 and 262 of optical fiber 223 are cut and polished at angles to assure that reflections am not introduced into the light signal. The distance between ends 261 and 262 determines the magnitude of the attenuation. For example, the amount of light leaving end 261 and entering end 262 depends on the solid angle subtended by end 262. As the distance between the ends increases, the solid angle in question decreases. A second attenuation occurs when the light returns after being reflected by mirror 231 shown in FIG. 3.

If the RIN is very large, it is not always possible to sufficiently attenuate the reference signal sufficiently make the RIN less than the shot noise without causing the signal to be dominated by noise from the detector. For example, this situation can occur if one attempts to operate the system at too low of a beat frequency. One method for curing this defect is to use some of the light which is attenuated in the reference arm of the interferometer to detect the RIN and subtract it from the measured signal. An embodiment of the present invention which utilizes this technique is shown in FIG. 5 at 300. Components of interferometer 300 which serve functions analogous to those in interferometer 200 are referenced by like numerals and will not be discussed further here. Interferometer 300 includes an additional optical coupler 342 which captures part of the light returning from mirror 331. The light intensity of the captured light is measured by photodetector 344. The measured intensity is then subtracted from the output of detector 327 via subtraction circuit 346. While this embodiment of the present invention is more complex than interferometer 200, it is still superior to interferometer 10 in that it has a greater scan distance.

While the embodiment shown in FIG. 5 utilizes a light sample derived from the reference arm, it will be apparent to those skilled in the art that the light sample in question could be derived directly from the light source by including a beam splitter after light source. For example, optical coupler 342 shown in FIG. 5 could be moved to fiber 313.

There has been described herein a low-coherence interferometer which provides reduced complexity and increased scan distance. Various modifications to the present invention will become apparent to those skilled in the art from the foregoing description and accompanying drawings. Accordingly, the present invention is to be limited solely by the scope of the following claims.

What is claimed is:

1. An optical interferometer for measuring the optical properties of a device, said interferometer comprising:
   source means for providing a low-coherence light signal;
   first splitting means for dividing said low-coherence light signal into first and second light signals, said first light signal being applied to said device and said second light signal being directed into a reference optical path, said first splitting means further comprising means for combining light returning from said device and from said reference optical path and applying said combined light to a first optical detector;
   means disposed in said reference optical path for attenuating the light signals traveling therein, said attenuation being chosen to reduce the relative intensity noise generated in said first optical detector. Said attenuating means attenuating said light from said reference optical path that is combined with said light returning from said device by said first splitting means;
   means for varying the optical path length of said reference optical path relative to the optical path between said splitting means and said device.

2. The optical interferometer of claim 1 wherein said attenuating means comprises a gap in an optical fiber in said reference optical path.

3. The optical interferometer of claim 1 further comprising:
   second beam splitting means for applying a portion of the light returning from said source means to a second optical detector and means for subtracting the output of said second optical detector from the output of said first optical detector.

* * * * *